Nov. 11, 1930.  H. E. BLOOD ET AL  1,780,898
GEAR SHIFT MECHANISM
Filed Nov. 27, 1925   5 Sheets-Sheet 5
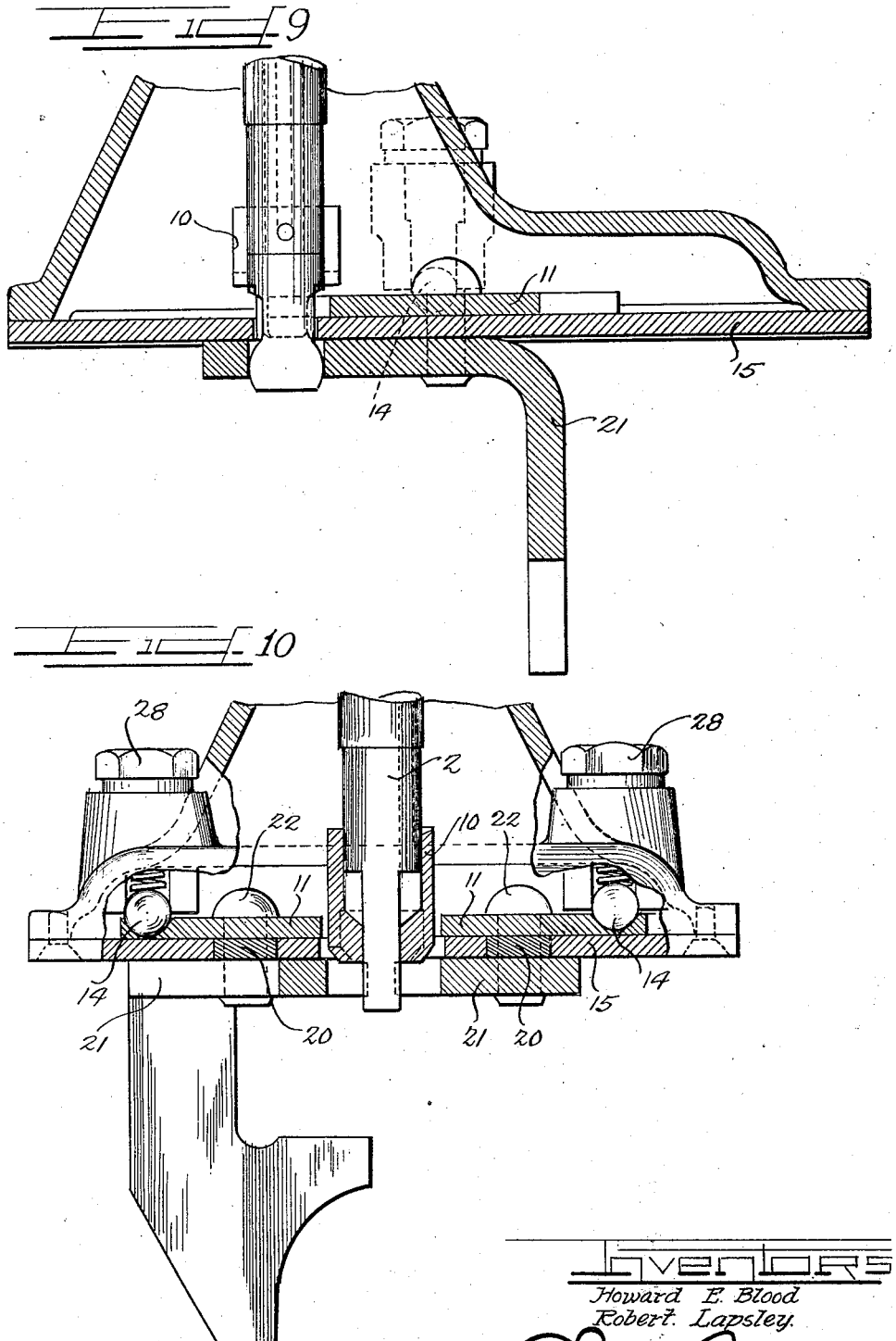

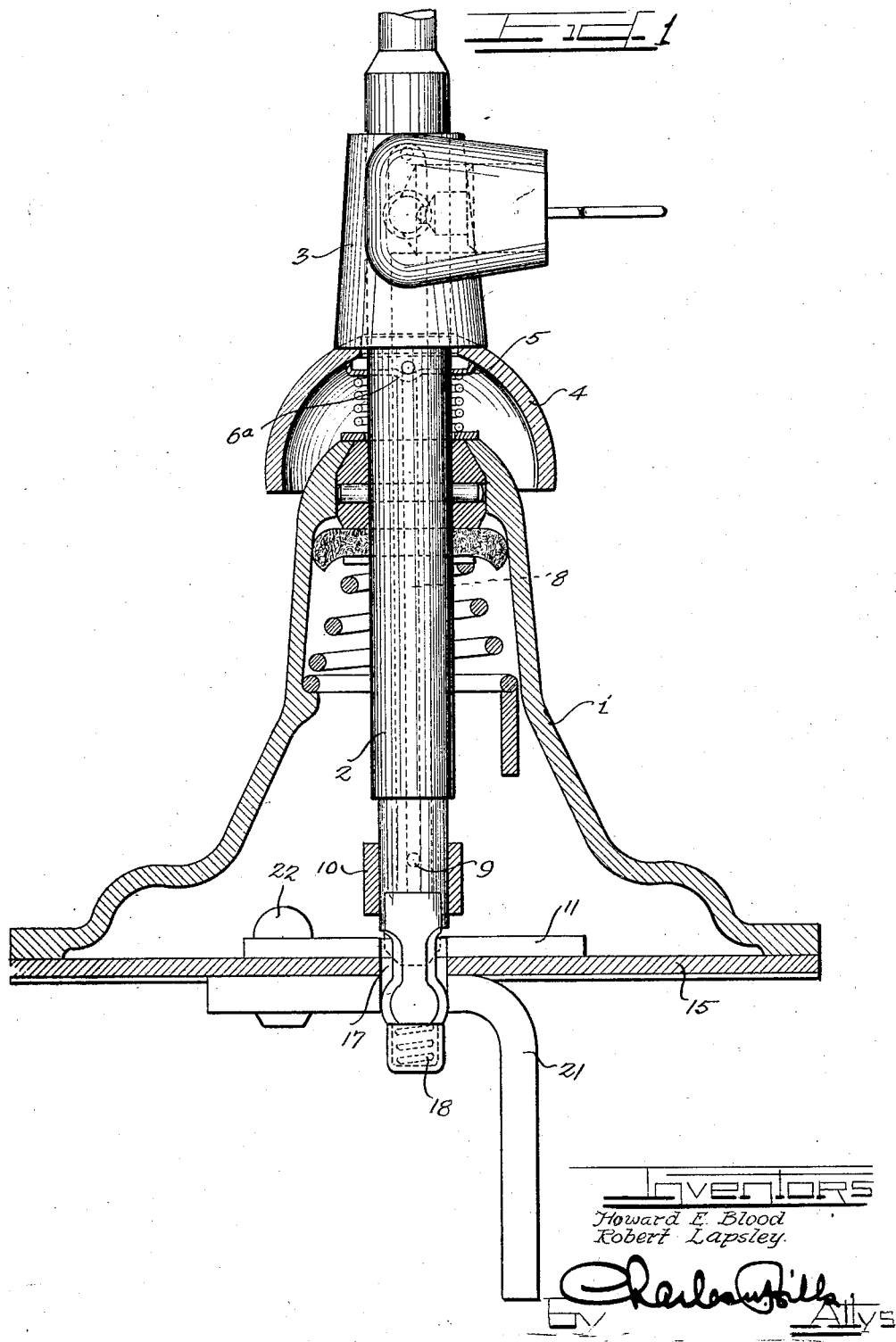

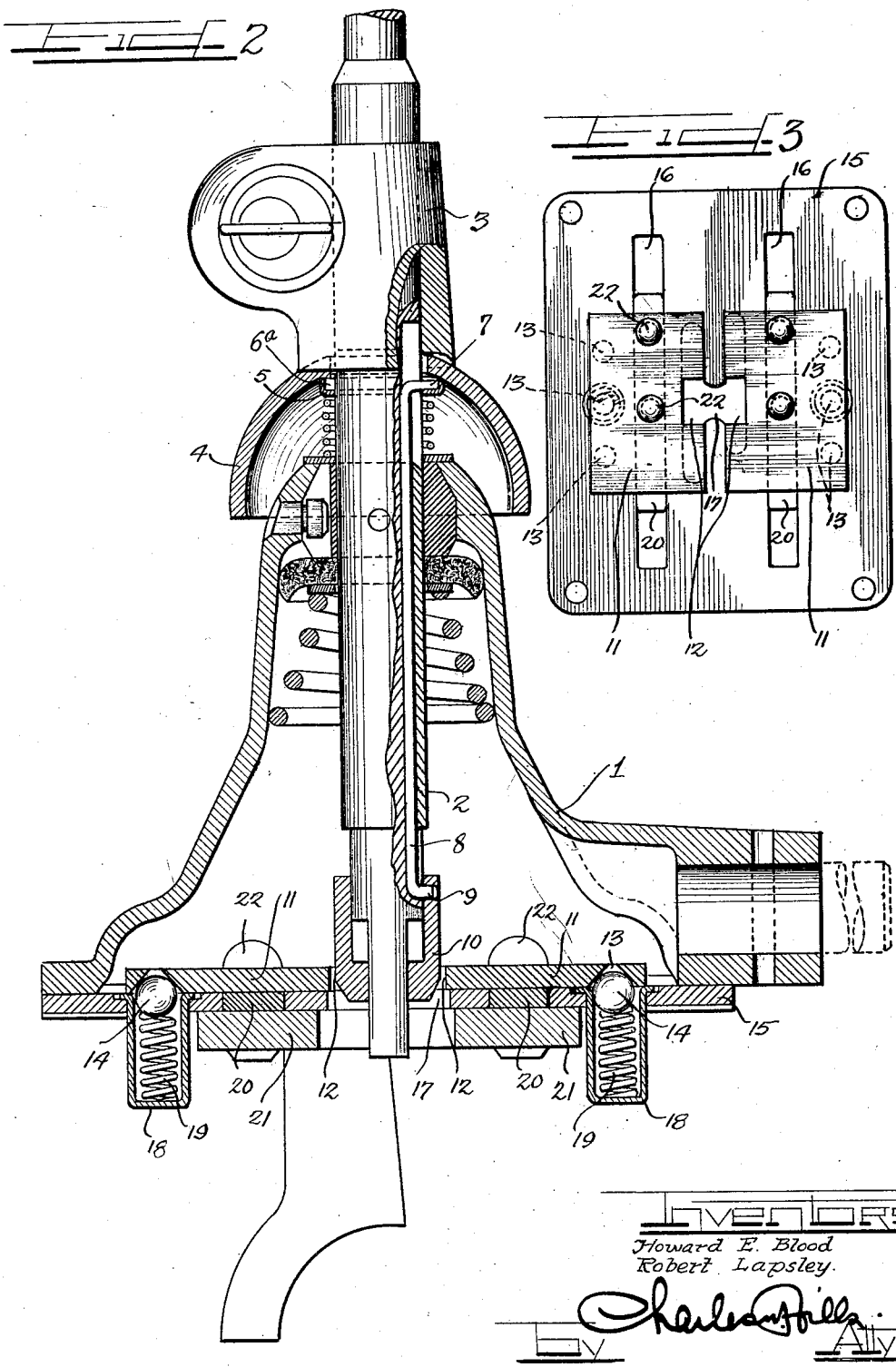

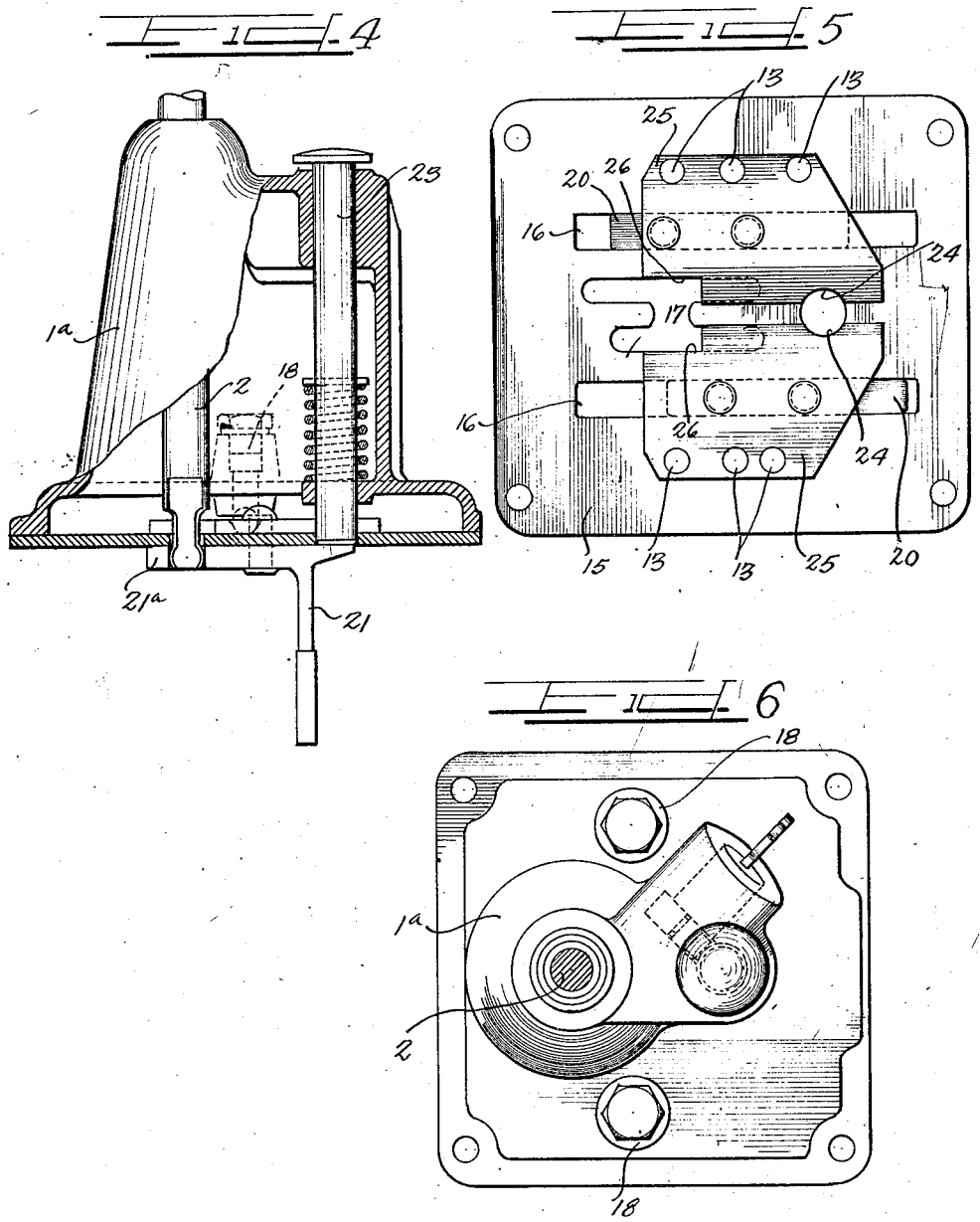

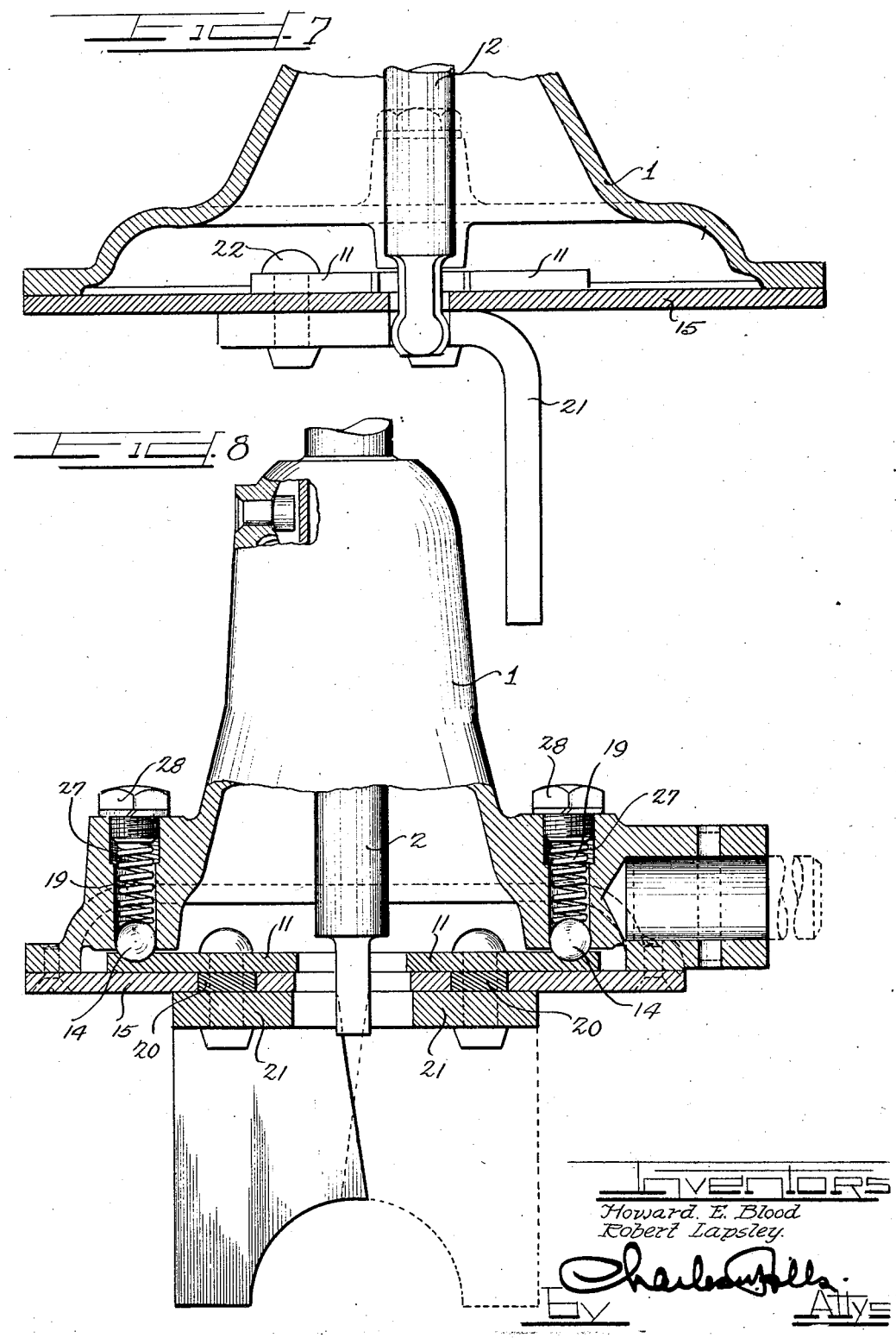

Patented Nov. 11, 1930

1,780,898

UNITED STATES PATENT OFFICE

HOWARD E. BLOOD AND ROBERT LAPSLEY, OF DETROIT, MICHIGAN, ASSIGNORS TO DETROIT GEAR & MACHINE COMPANY, OF DETROIT, MICHIGAN, A CORPORATION OF MICHIGAN

GEAR-SHIFT MECHANISM

Application filed November 27, 1925. Serial No. 71,511.

This invention relates to gear shift mechanism of that type usually employed upon motor cars.

It is an object of this invention to simplify and reduce the cost of such gear shift mechanism in the elimination of the usual guide rods upon which the forks are mounted and which are expensive to machine, aline and assemble.

This particular enumerated object may be carried out in various way. The different forms, however, that the invention may assume generally comprise mechanism supported between the transmission housing and cover, having suitable guideways for guiding the gear shift forks and a directional slot preferably of the H type for guiding the usual universal gear shift lever.

Other objects and advantages of this invention need not now be specifically mentioned as they will become apparent in the following description and disclosures.

The invention comprises the novel structure and combinations hereinafter described and more particularly pointed out and defined in the appended claims.

In the accompanying drawings which illustrate certain preferred embodiments of this invention and in which similar reference numerals refer to similar features in the different views:

Figure 1 is a part sectional and part elevational view of a gear shift mechanism involving this invention.

Figure 2 is a view similar to Figure 1 but taken through the gear shift mechanism at right angles to Figure 1.

Figure 3 is an enlarged top plan view of the guiding mechanism for the gear shift lever and forks.

Figure 4 is a part sectional and part elevational view of a slightly modified form that the invention may assume.

Figure 5 is an enlarged top plan view of the guiding mechanism for the forks and gear shift lever of the modification.

Figure 6 is a top plan view of the structure shown in Figure 4.

Figure 7 is an enlarged fragmentary sectional view of the gear shift mechanism as shown in Figures 1 and 2, with the mesh locking balls confined in the cover instead of in separate thimbles.

Figure 8 is a part sectional and part elevational view of the structure shown in Figure 7, the sectional part being at right angles to the plane of Figure 7.

Figure 9 is a fragmentary sectional view of a gear shift mechanism involving this invention in which the lever is off center.

Figure 10 is a fragmentary sectional view taken at right angles to the plane of Figure 9.

The invention in its broadest aspect contemplates a support having guideways or guide slots in combination with gear shift elements or forks having guiding portions extending thru said guide slots and having portions overlapping the upper surface of said support for operation by a gear shift lever, a simple mechanism for carrying out this invention is illustrated.

Referring now to Figures 1 to 3, there is shown the usual transmission casing cover 1 in which a lever 2 is mounted for universal movement as is well-known in the art. Above the fulcrum of the lever there is a slidable locking sleeve 3 which bears against a movable semi-spherical hood or cap 4. Beneath the hood 4 there is a slidable ring member 5 provided with opposite notches 6 (Figure 1) which engages a bent end 7 on a vertical rod 8 located in a vertical groove in the lever 2 and a pin 6ª extending from the vertical lever 2. The lower end of the rod 8 projects at right angles as indicated at 9 and extends through a locking collar 10. The sleeve 3 may be shifted downwardly forcing the hood 4 over the upper end of the casing to prevent tampering with the lever 2. The sleeve 3 may be locked in this position. When the hood 4 is forced down, the rod 8 will likewise be shifted downwardly, forcing the sleeve member 10 into the adjoining apertures of a pair of shifting plates 11 to lock the same against movement. It will be noted that the lever 2 is suitably slotted adjacent the ends 7 and 9 of the rod 8 to allow said rod to slide relative to the lever 2.

The shifting plates 11 are best shown in Figure 3. Each has an intermediate lateral notch 12 in its inner edge in which the lower end of the lever 2 may be engaged. The lower surface of each plate 11 is provided with a series of conical depressions 13 for receiving a spring impelled retaining or locking member 14 in the form of a ball. The shifting plates 11 rest upon a plate support 15 positioned between the cover 1 and the transmission casing. This support 15 is in the form of a plate having a pair of spaced parallel slots 16. Between the slots 16 there is an H-shaped slot 17, the transverse connecting branch of which registers with the notches 12 as shown in Figure 3. The support 15 is also provided with suitable apertures in which thimbles 18 are supported in the plane of the locking apertures 13. The aforementioned locking members 14 are confined in these thimbles 18 and rest upon the springs 19 contained in said thimbles. The action of these locking members in preventing accidental shifting is well-known in the art and need no further description. A pair of guide members 20—20 in the form of narrow blocks are slidably retained in the aforementioned slots. The upper ends of the gear shifting forks or yokes 21 are attached to these guide blocks 20, which in turn are respectively attached to the shifting plates 11 by rivets 22 or the like. Preferably the same rivets secure both the forks and the guide blocks.

In referring to Figures 1 and 2, it will be noted that the lower end of the lever 2 projects through the shifting plates 11, the supports 15 and between the yoke members 21. When this lever is shifted into one of the notches 12 of the shifting plates, it will be in one of the branches of the H-shaped slot in the support 15 and it may be operated for shifting such plate 11. The shifting of the plate 11 will, of course, shift the yoke 21 attached thereto for engaging or disengaging the gears of the change speed gearing.

Referring now to Figures 4 to 6 which illustrate a slightly modified form of the invention, it will be noted that the transmission casing 1ª is of a slightly different form to accommodate the vertical locking rod 23 which is adapted to enter the notches 24 in a pair of shifting plates 25 when the same are in neutral position for locking the gear shift mechanism against unauthorized use. This locking mechanism is, however, claimed in a copending application and need not be specifically described.

In this modified form of the invention, a similar support 15 is used as in the first form. It is positioned at the bottom of the casing in the same manner and supports the shifting plates 25. These shifting plates 25 differ slightly from those shown in the first form in that the notches 26 for the lever extend inwardly from one end of the plates; consequently these plates can be engaged directly by the lever for shifting in only one direction. These shifting plates 25 have conical locking depressions 13 for the locking members as in the first form. They likewise support guide blocks 20 which slide in the parallel slots 16 in the base support 15. The gear shifting forks or yokes 21 are carried by the guide blocks 20 and the ends of the attaching portions of these yokes extend in the path of the lower end of the lever 2 as indicated at 21ª in Figure 4. In this modified form the thimbles 18 for the mesh locking balls are supported above the shifting plates 25.

In the operation of this modified form, the lever 2 will shift the forks in one direction by engaging the shoulders formed by the notches 26 in the plates 25. For shifting the forks in the other direction, the lever 2 will directly engage the extensions 21ª.

In Figures 7 and 8 there is shown a structure similar to the structure first described with the exception that the thimbles for confining the locking members are omitted. Instead of such thimbles, suitable apertures 27 are formed in the cover which is provided with suitable walls therefor. The mesh locking balls 14 are confined in these apertures beneath the springs 19 which in turn are held in by the nuts 28 screwed into the casing.

In Figures 9 and 10 the construction is substantially the same as shown in Figures 7 and 8 with the exception that the gear shift lever 2 is eccentrically mounted, being a short distance from the center in order to provide accommodation for a particular form of locking mechanism.

From the foregoing, it will be apparent that a novel form of gear shift mechanism has been provided which is less expensive and more efficient than existing structures for a similar purpose and difficulty in the use of guide rods has been eliminated and which is conducive to an easier operation of the gear shift lever.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. In a gear shifting mechanism, a casing, a lever pivoted in said casing, a support attached to the bottom of the casing, said support having a pair of parallel slots, a pair of shifter plates slidably supported on said support and comprising means extending into said parallel slots, a shifter fork supported by each plate, and means for operating said shifter plates.

2. In a gear shifting mechanism, a transmission cover casing, a plate having an H slot and a pair of parallel guide slots at the bottom of said casing, gear shifting forks having guiding means extending into said parallel slots, and a notched plate secured to each guiding means above said first mentioned plate for slidably maintaining said guiding means in said parallel slots.

In testimony whereof we have hereunto subscribed our names.

HOWARD E. BLOOD.
ROBERT LAPSLEY.